Figure 1:
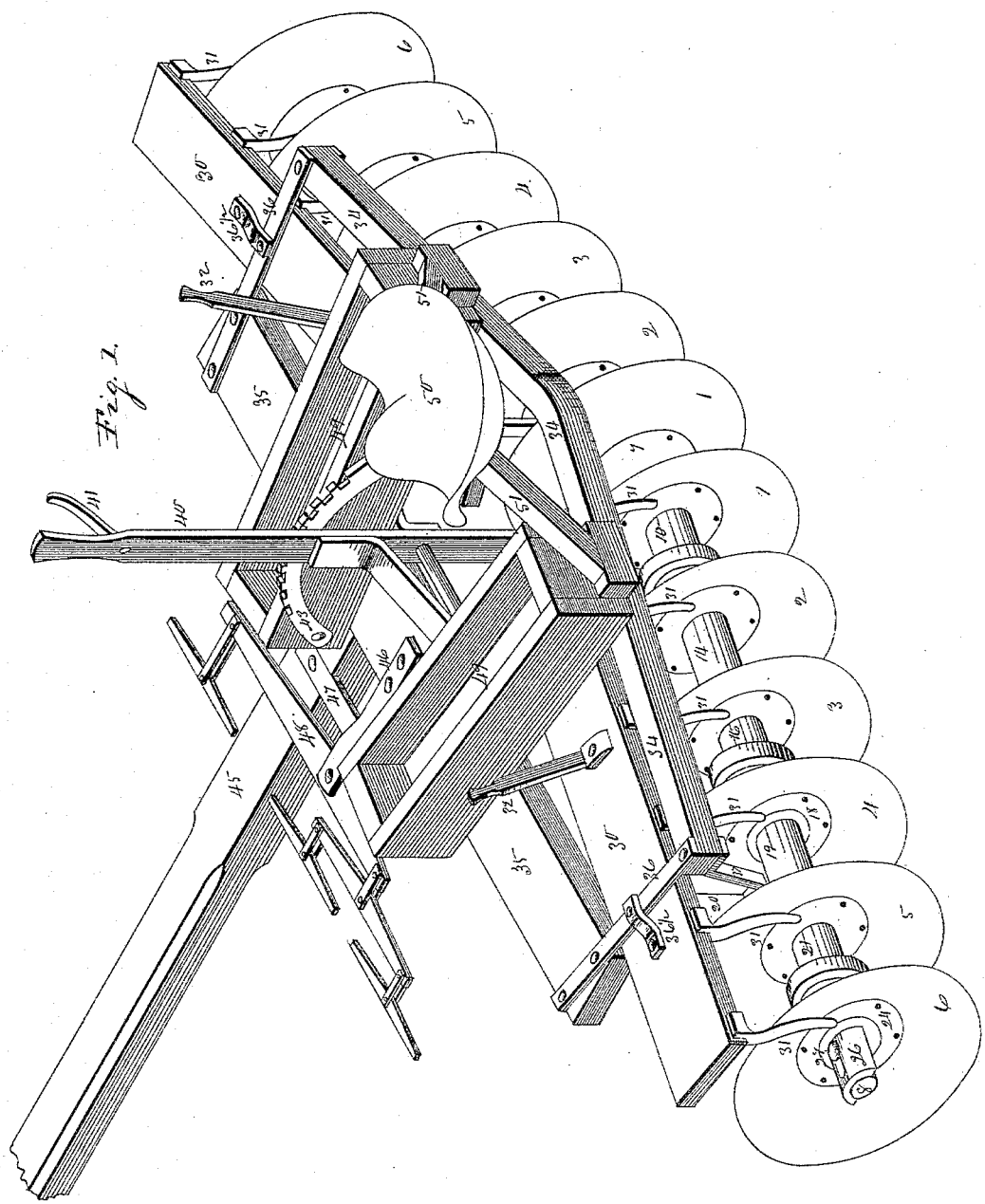

(No Model.) 2 Sheets—Sheet 1.

A. BYINGTON.
HARROW.

No. 359,995. Patented Mar. 29, 1887.

Witnesses,
Chas Shinnen
A. O. Behel

Inventor
Albert Byington.
Per Jacob Behel
Atty.

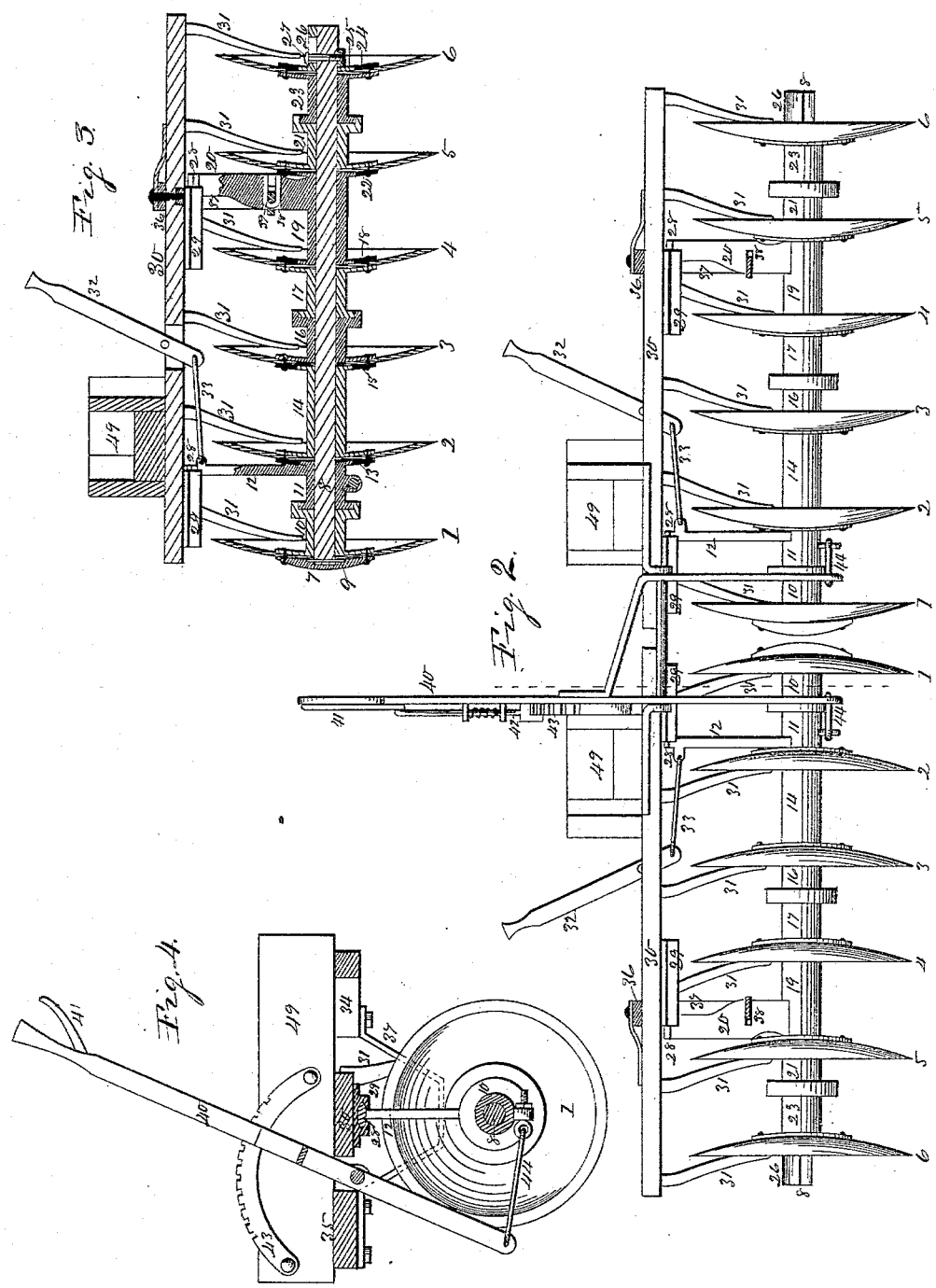

UNITED STATES PATENT OFFICE.

ALBERT BYINGTON, OF ROCHELLE, ILLINOIS.

HARROW.

SPECIFICATION forming part of Letters Patent No. 359,995, dated March 29, 1887.

Application filed September 29, 1886. Serial No. 214,889. (No model.)

*To all whom it may concern:*

Be it known that I, ALBERT BYINGTON, a citizen of the United States, residing at Rochelle, in the county of Ogle, in the State of Illinois, have invented new and useful Improvements in Harrows, of which the following is a specification.

This invention relates to a class of farm-implements known as the "disk-harrow," in which disks are employed to cultivate the soil. Its object is to produce a more efficient implement of its class. To accomplish this purpose I have designed and constructed the apparatus represented in the accompanying drawings, which embody my improvements, which are to a considerable extent detail improvements and extend to substantially all parts of the machine, and, in connection with the drawings, will be hereinafter more fully described.

In the accompanying drawings, Figure 1 is an isometrical representation of a machine embodying my invention. Fig. 2 is a front elevation in which the disk-shafts are in line, and in which the front beam of the frame and the tongue and its appliances are omitted. Fig. 3 is a vertical section of the left-hand disk-frame cut in the plane of the axial center of its disk-shaft, and Fig. 4 is a transverse vertical section cut on the dotted line $a$ on Fig. 2.

The rotary disks 1, 2, 3, 4, 5, and 6 in two like gangs employed in my improved harrow are of the usual concave variety in common use in like harrows. The several disks in their respective gangs are each provided with tubular hubs capable of an independent rotary movement on an axle-tree support. The disk 1 on the inner end of the axle-tree is provided with an end cap, 7, recessed centrally on its concave side to receive the end of the disk-supporting axle-tree 8, and also a linchpin, 9, passed through the end of the axle-tree outside of the disk to hold it in place on the axle-tree. A tubular hub, 10, with flanged end to engage the concave side of the disk, is placed on the axle-tree on the concave side of disk 1, and, in connection with the end cap, 7, is fixed in place on the disk by bolts or rivets passed through the parts at proper intervals.

The free end of the hub 10 is recessed on its outer end face and receives the flanged end 11 of the tubular hub of the pendent support 12 of the inner end of the axle-tree. This connection of the disk with the axle-tree permits it to rotate thereon, and its recessed end connection with the flanged end of the tubular hub of the pendant forms a connection to exclude dirt from the joint.

The outer end of the tubular hub of the pendant 12 is flanged, and is concave, to engage the convex surface of the disk 2. An annular ring, 13, to receive the flanged outer end of the tubular hub of the pendant, is placed on the convex surface of the disk. A tubular hub, 14, is placed on the axle-tree on the concave side of the disk, and its flanged end engages its concave side, and, in connection with the annular ring 13, is fixed in place on the disk by bolts or rivets passed through the parts at proper intervals. This annular ring and flanged outer end of the pendant forms a free connection of the disk and pendant to exclude dirt.

The construction and connection of the outer end of the tubular hub 14, the annular ring 15, and the tubular hub 16 with disk 3 is substantially identical with that described in connection with disk 2.

The tubular hub 17 in its construction and connection with the axle-tree and with the outer end face of the tubular hub 16 is substantially identical with the construction of the tubular hub end of the pendant 12 and its connection with the recessed face end of the tubular hub 10.

The outer flanged end of the tubular hub 17 is concave, and engages the convex surface of the disk 4, and, in connection with the annular ring 18 on the concave side of the disk, is fixed in place thereon by bolts or rivets connecting the parts at proper intervals.

The inner flanged end of the tubular hub 19 of a pendent support, 20, to the outer end portion of the axle-tree 8 enters within the annular ring 18 of disk 4, and its connection therewith is free to permit the disk to rotate and exclude dirt from the joint. The tubular hub 21 and annular ring 22, in their construction and connection with disk 5, and the construction and connection of the flanged outer end of the tubular hub of the pendent support 20 with the axle-tree and with each other, are substantially identical with the disk 2 in its construction and connection with the parts, as shown and hereinbefore described.

The tubular hub 23, in its construction and in its connection with the axle-tree 8, with the recessed outer end of the tubular hub 21, and with the disk 6 and annular ring 24, is substantially identical with like parts of disk 4, and for the same purpose. A disk-collar, 25, to receive the axle-tree and enter within the annular ring 24 on disk 6, is employed to hold the disk in place on the axle-tree. This disk-collar is provided with a semi-sleeve, 26, slotted lengthwise to receive a bolt, 27, to fix it in place on the axle-tree, and its bolt-and-slot connection with the axle-tree furnishes the means for adjustment lengthwise of the axle-tree to hold the several disks in proper position thereon to permit them to rotate without unnecessary freedom. In this construction of the disk-connections the several disks are capable of independent rotation, and their connections are practically proof against the admission of dirt to the journal-bearings.

The upper ends of the pendent supports 12 and 20 are provided with a right-angle arm, 28, of T form in section, and extend from the vertical arm of the pendants lengthwise of the axle-tree toward the center of the machine. The right-angle arms 28 are supported to slide endwise in guides 29, fixed to the under face of a beam-support, 30, to the gangs placed centrally over the axle-tree.

Scrapers 31, of a proper conformation to engage the concave surfaces of the disks, depend from the beam-supports in position to engage the concave surface of the disks when the gangs of disks are moved outward endwise relatively with the beam-support.

Each gang of disks is provided with a hand-lever, 32, pivotally connected with the beam-support, and a link, 33, pivotally connected with the depending end of the lever and with the pendent supports, serves to connect the disk-gang with the beam-support, to enable an attendant to shift the gangs from or against the scrapers, to remove adhering earth from the disks, or to shift the gangs to or from each other in the lengthwise direction of their axle-tree supports.

The main frame consists, essentially, of a rear beam, 34, and a front beam, 35, end bars, 36, placed on the upper surface of their end portions, and brackets depending from their end portions, bolted to the beams.

The beam-supports 30 to the disk-gangs toward their outer end portions are pivotally connected centrally with the end bars, 36, of the main frame, forming an eccentric pivotal connection of the disk-frame with the main frame, to permit the gangs to oscillate on their pivotal connection with the main frame. A clasp, 36½, fixed to the beam-support of the gangs, overspans the end bar, 36, and receives the pivot-bolt employed to connect the disk gangs with the main frame.

The pendent support 20, connecting the disk-gangs with the beam-support 30, is formed with a transverse slot, 38, on its inner face, to receive the horizontal portion of the depending bracket 37, and a staple, 39, having a free loop-connection centrally with the horizontal portion of the depending bracket, is received freely in holes formed in the pendent support for its reception, and forms a free end connection of the main frame with the disk-gangs, to permit of an endwise movement of the disk-gangs relatively with the beam-support.

A bifurcated hand-lever, 40, is pivotally connected to the weight-boxes 49, fixed on the main frame, and its uprising handle portion is provided with the usual thumb-lever, 41, and spring-actuated bolt 42, to engage a segment-ratchet, 43. The depending arms of the hand-lever 40 are independently connected with the inner pendent supports, 12, by a link, 44, to adjust the inner ends of the disk-gangs to place them in line or place them on an angle relatively with each other, with the main frame, or with the line of draft, by shifting their inner ends more or less from their line position, and when adjusted to the position required are held in their adjusted position by means of the spring-actuated bolt engaging the teeth of the segment-ratchet.

The tongue 45 is fixed to the main frame at one side of the draft-center of the machine, and a draft-bar, 46, fixed to the draft-center of the main frame, is connected to the tongue by a transverse bar, 47, to give firmness to the parts.

A three-horse evener, 48, with its evener and single-tree attachments of the usual construction, is connected to the forward end of the draft-bar. In its application of the tongue and eveners a three-horse team can be readily harnessed to the harrow.

Weight-boxes 49 are fixed on the main frame at each side of its center, and extend from the front rearward, and are intended to contain weights, when required, to force the disks into the ground. The ratchet-toothed segment 43 in this instance is fixed on one of the weight-boxes; but in the absence of the weighted box it may be fixed to any suitable portion of the main frame.

A seat, 50, is supported centrally on the rear portion of the machine on braces 51, rising from the main frame. The driver mounted in the seat on the machine can, by means of the bifurcated hand-lever 40, move the inner ends of the disk-gangs forward or rearward to adjust the disks to the required angle relatively with the line of draft to vary their action on the soil in cultivation, and by means of the hand-levers 32 on each side of the seat can shift the disk-gangs to engage the scrapers to relieve them of adhering earth and to regulate the distance between the inner disks in the forward and rearward movement of the inner ends of the disk-gangs.

In the foregoing the several disks of their respective gangs are shown and described as capable of independent rotary movement on their axial support; but evidently in each gang one of the disks (as disk 1) may be fixed to the axle-tree to rotate therewith, and the remainder of the disks in their respective gangs be capable of independent rotary movement on the axle-tree, which may rotate in its pendent supports.

I claim as my invention—

1. In a disk-harrow, a disk mounted on the inner end of its axle-tree support, said disk having a tubular hub to receive the axle-tree and engaging the concave face of the disk, a linchpin to hold the disk in place, and a cap to inclose the end of the axle-tree and engage the convex side of the disk, said hub, disk, and cap fixed to each other and in place on the axle-tree, substantially as and for the purpose set forth.

2. The combination, with the main frame and with the axle-tree, of a pendant with tubular-hub support to the axle-tree, said hub-support flanged at its end to enter the recessed face end of the disk-hub, substantially as and for the purpose set forth.

3. The combination, with the main frame and with the axle-tree, of a pendant with tubular-hub support to the axle-tree, said hub-support flanged to enter within the annular ring on the convex side of a disk, substantially as and for the purpose set forth.

4. In a disk-harrow, a tubular hub to receive the axle-tree, said hub flanged at one end to engage the concave side of the disk, and an annular ring to engage the convex side of the disk, said hub, disk, and annular ring fixed to each other and mounted to rotate on the axle-tree, substantially as and for the purpose set forth.

5. In a disk-harrow, a tubular hub to receive the axle-tree, said hub flanged at one end to engage the concave side of a disk and fixed thereto, and its other end flanged to enter within the annular ring fixed to the convex side of a contiguous disk, said disks capable of independent rotations on the axle-tree, substantially as and for the purpose set forth.

6. In a disk-harrow, a tubular hub to receive the axle-tree, said hub flanged at one end to engage the concave side of a disk and fixed thereto, and its free end recessed on its face side, a hub to receive the axle-tree, with flanged end to engage the convex side of a contiguous disk and fixed thereto, and its free end flanged to enter the recessed face end of a contiguous hub, said hubs and their respective disks capable of independent rotations, substantially as and for the purpose set forth.

7. In a disk-harrow, a tubular-hub support to the axle-tree, said hub flanged at one end to enter within the annular ring fixed to the concave side of a disk, and its other end flanged to enter within the annular ring fixed to the convex side of a contiguous disk, said disk capable of independent rotations, substantially as and for the purpose set forth.

8. The combination, with the axle-tree and with a disk having an annular ring fixed to its concave side, a disk-collar to receive the axle-tree and enter within the annular ring fixed to a disk, said collar having a semi-sleeve, slotted, and a bolt to fix said collar adjustably on the axle-tree, substantially as and for the purpose set forth.

9. The combination, with the disk-gangs capable of axial movements, of fixed depending scrapers to engage the disks in the endwise movements of the gangs, substantially as and for the purpose set forth.

10. The combination of disk-gangs capable of independent axial movements in the same or opposite directions, a beam-support to the gang pivotally connected to the main frame, pendent supports connecting the axle-tree of the gangs with their beam-supports, said axle capable of a rotary movement in its pendent support, and said pendant capable of a lengthwise sliding movement in its guide-connection with its beam, substantially as and for the purpose set forth.

11. The combination of the beam-support to the disk-gangs, pendent supports connecting the disk-gang with the beam-support and having an endwise sliding connection therewith, and connecting the axle-tree of the gangs with their beam-support, said axle-tree capable of a rotary movement in its pendent support, a lever pivotally connected with the beam-support, and a link connecting its depending end with the pendent support to impart an axial or endwise movement to the disk-gang relatively with its beam-support, substantially as and for the purpose set forth.

12. The combination, with the pendent support to the disk-gang and with the bracket depending from the main frame, of a slot-and-staple connection of the bracket and pendent support, substantially as and for the purpose set forth.

13. The combination of the weight-boxes fixed on the main frame parallel with the draft-line, a bifurcated hand-lever pivotally connected with the weight-boxes, and an independent link-connection of the independent depending arms of the bifurcated lever with their respective disk-gangs, substantially as and for the purpose set forth.

14. The combination, with the main frame and with the independent disk-gangs having a pivotal connection, of weight-boxes supported on the main frame, said weight-boxes located centrally on the main frame and parallel with the draft-line, substantially as and for the purpose set forth.

15. The combination of weight-boxes supported on the main frame, a bifurcated hand-lever pivotally supported on the weight-boxes, and their depending ends independently connected with their respective disk-gangs, a segment-ratchet fixed to the weight-box, a spring-actuated bolt and thumb-lever mechanism fixed to the hand-lever to engage the teeth of the ratchet, substantially as and for the purpose set forth.

16. In a disk-harrow, the combination, with the main frame, of a tongue having an eccentric connection with the main frame, a draft-bar concentrically connected with the main frame, and a transverse bar connecting the draft-bar with the tongue, substantially as and for the purpose set forth.

ALBERT BYINGTON.

Witnesses:
D. W. BAXTER,
O. J. COOK.